(12) United States Patent
Yanagi (10) Patent No.: US 6,278,727 B1
(45) Date of Patent: *Aug. 21, 2001

(54) CDMA SYNCHRONOUS ACQUISITION CIRCUIT

(75) Inventor: Shuzo Yanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/489,360

(22) Filed: Jan. 21, 2000

Related U.S. Application Data (62) Division of application No. 08/905,601, filed on Aug. 4, 1997.

(30) Foreign Application Priority Data

Aug. 12, 1996 (JP) .................................................. 8-212546

(51) Int. Cl.[7] .................................................. H04L 27/30
(52) U.S. Cl. ........................ 375/150; 375/142; 375/149; 370/441
(58) Field of Search .................................. 375/150, 149, 375/220, 229, 345, 142; 370/441

(56) References Cited

U.S. PATENT DOCUMENTS

| | | | |
|---|---|---|---|
| 5,778,028 | * | 7/1998 | Turner .................................. 375/229 |
| 5,862,139 | * | 1/1999 | Yanagi .................................. 370/441 |
| 6,064,688 | * | 5/2000 | Yanagi .................................. 375/149 |

FOREIGN PATENT DOCUMENTS

| | | |
|---|---|---|
| 2-211720 | 8/1990 | (JP) . |
| 5-64168 | 3/1993 | (JP) . |
| 6-21982 | 1/1994 | (JP) . |
| 6-261088 | 9/1994 | (JP) . |
| 6-326739 | 11/1994 | (JP) . |
| 7-202751 | 8/1995 | (JP) . |

* cited by examiner

Primary Examiner—Stephen Chin
Assistant Examiner—Shuwang Liu
(74) Attorney, Agent, or Firm—Hutchins, Wheeler & Dittmar (57) ABSTRACT

A CDMA synchronous acquisition circuit for receiving a CDMA signal and performing synchronous acquisition on the CDMA signal, comprises a receiving unit for receiving a signal and decoding the received signal to a reception base band signal which is spread-modulated in a CDMA mode, a correlation circuit for calculating a correlation value for the received base band signal every timing within one chip of a spread code by a correlator, and means for detecting the maximum value of the correlation value to estimate the spread code generation timing of a spread-modulated transmission base band signal within a precision of one chip of the spread code, wherein the correlator includes offset removing means for removing a DC offset component due to unbalance of the code balance of the spread code.

14 Claims, 10 Drawing Sheets

42 DC OFFSET COMPONENT

41
DC OFFSET COMPONENT

CDMA SYNCHRONOUS ACQUISITION CIRCUIT

This application is a Divisional of U.S. application Ser. No. 08/905,601, filed Aug. 4, 1997 (Pending).

BACKGROUND OF THE INVENTION

1. Field of the Invention

The present invention relates to a CDMA synchronous acquisition circuit of a receiver using a spread spectrum communication system based on CDMA (Code Division Multiple Access), and particularly to a CDMA synchronous acquisition circuit of a CDMA receiver which is used in a mobile communication system.

2. Description of the Related Art

According to the CDMA communication system, transmission data are transmitted while subjected to spread-spectrum processing by using spread codes at a transmitter, and the transmission data thus transmitted are subjected to inverse spread-spectrum processing by using the replica of the spread codes at a receiver, thereby decoding reception data. M sequence (Maximum Length Code) or GOLD code is generally used as the spread codes. In the above coding, the number of the positive codes and the number of the negative codes are substantially equal to each other in the code sequence length, and thus code balance is established.

Further, the synchronous acquisition circuit is a circuit for accurately estimating the phase (code generation timing) of a spread code to perform the inverse spread processing on the reception signal, and it works to estimate the code generation timing of the spread code generated at the transmitter and the code generation timing of the spread code prepared at the receiver within a precision of one chip of the spread code, and start the operation of a spread code generator at the receiver at the above timing.

Figure 7:
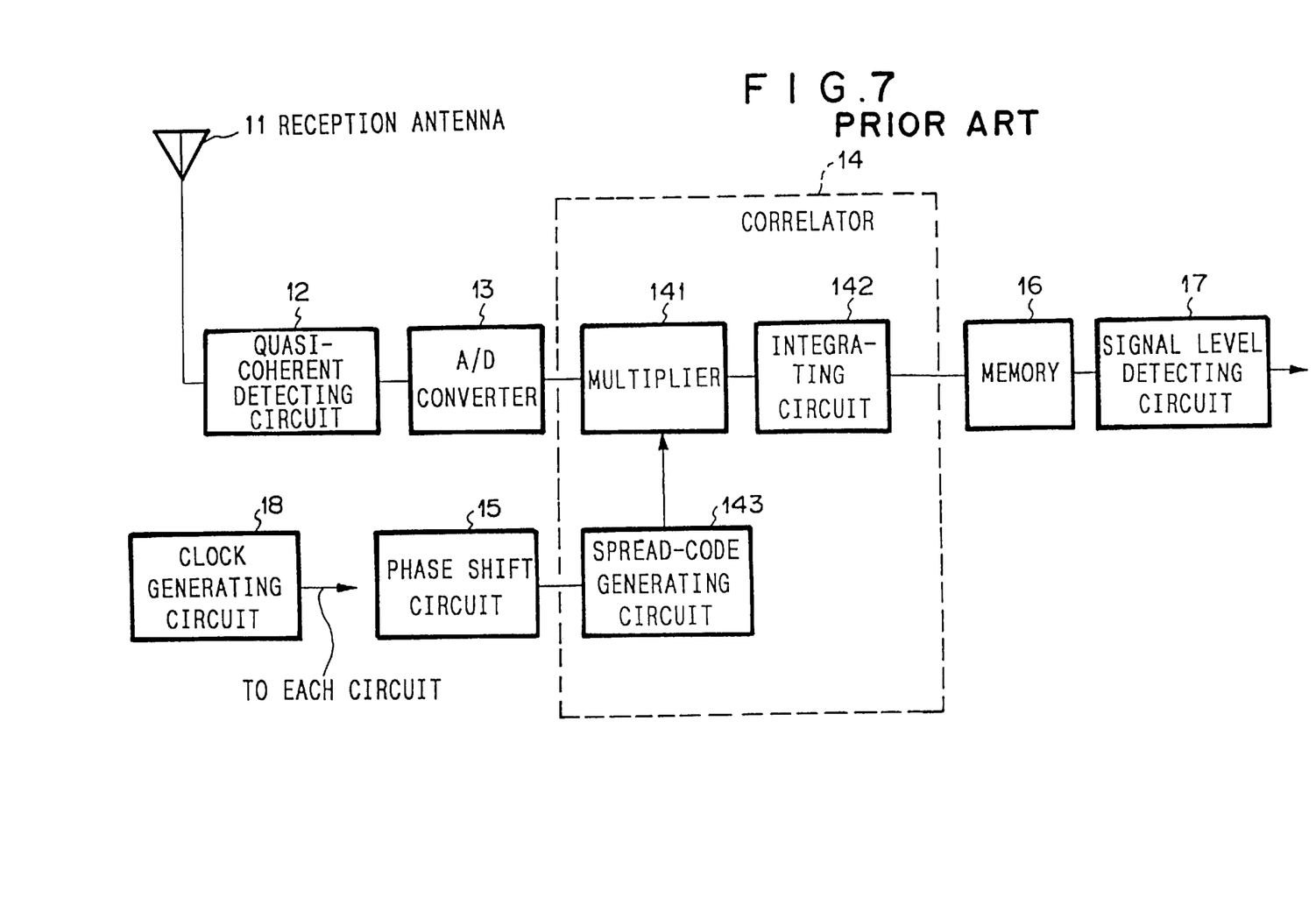
FIG. 7 is a block diagram showing a conventional CDMA synchronous acquisition circuit.

FIG. 7 is a schematic block diagram showing a conventional CDMA synchronous acquisition circuit. The synchronous acquisition circuit shown in FIG. 7 includes a reception antenna for receiving a transmission signal from a transmitter (not shown), a quasi-coherent detecting circuit 12 for converting the received signal to a base band signal, an A/D converter 13 for converting the base band signal to digital data, a correlator 14 for calculating a correlation value output from the digital data after the A/D conversion, a phase shift circuit 15 for shifting the code generation timing of the spread code by a fixed time, a memory 16 for accumulating the correlation value of the spread code by one period of the spread code, a signal level detecting circuit 17 for detecting the maximum correlation value level from the correlation value level which is accumulated over one period of the spread code in the memory 16, and a clock generating circuit 18 for generating clocks needed to each part of the circuits. The correlator 14 contains a multiplier 141, an integrating circuit 142 and a spread code generating circuit 143.

In this construction, an RF (Radio Frequency) signal which is received from the reception antenna 11 is converted to the base band signal in the quasi-coherent detecting circuit 12, converted to the digital signal in the A/D converter 13, and then input to the correlator 14. In the correlator 14, the spread code sequence output from the spread code generating circuit 143 is multiplied by the output signal of the A/D converter 13 every one-chip of the spread code by using the multiplier 141. The output of the multiplier 141 is input to the integrating circuit 142, and integrated over the length of the spread code sequence. The output of the integrating circuit 142 is set as a correlation value at a spread code generation timing of the spread code sequence. The output of the correlator 14 is accumulated in the memory 16.

After the correlation value is output from the correlator 14, the spread code generating circuit 143 is shifted in phase by a fixed time which is shorter than the chip rate of the spread code by the phase shift circuit 15, calculates a correlation value from the reception signal at the spread code generation timing in the same manner as described above, and the stores the correlation value in the memory 16. Accordingly, in the memory 16, the correlation value which is calculated over the phase timing within one chip of the spread code sequence is accumulated over one period. Subsequently, a reception delay position having the maximum correlation value level is selected from the correlation value level accumulated in the memory 16 by the signal level detecting circuit 17. By using the reception delay position, the reception signal is subjected to inverse spread processing in an inverse spread circuit (not shown) by using the spread code sequence generated from the reception delay position as a replica.

Next, the construction of a CDMA receiver containing a conventional DC (Direct Current) offset removing circuit will be described.

Figure 8:
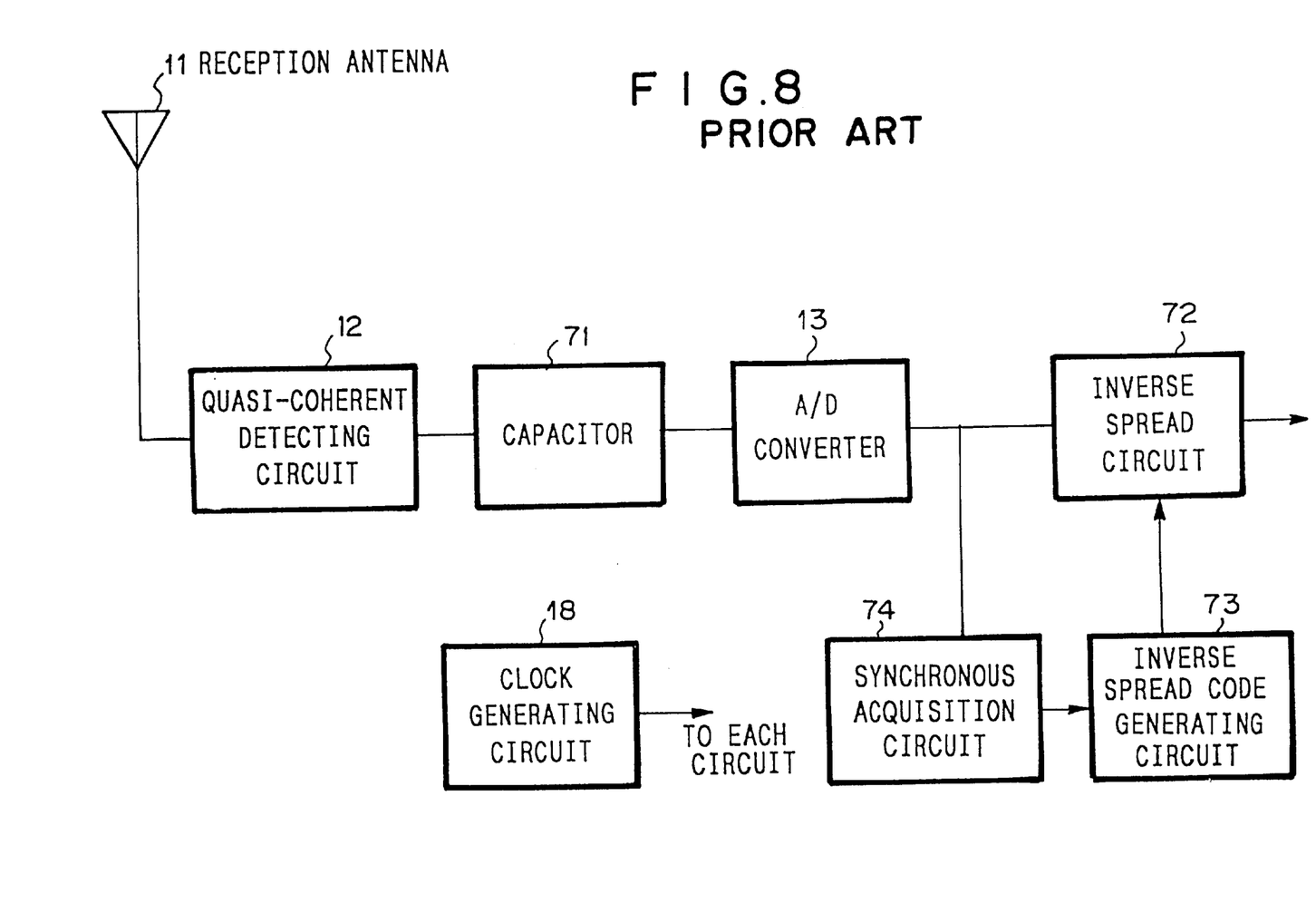
FIG. 8 is a block diagram showing a conventional CDMA receiver.

FIG. 8 is a schematic block diagram showing a CDMA receiver disclosed in Japanese Laid-open Patent Application No. Hei-2-47911. The receiver shown in FIG. 8 includes a reception antenna 11 for receiving a transmission signal from a transmitter (not shown), a quasi-coherent detecting circuit 12 for converting the reception signal to a base band signal, a capacitor 71 for removing DC offset components, an A/D converter 13 for converting to digital data the signal after the DC offset components are removed, a synchronous acquisition circuit 74 for calculating a correlation value for each phase timing of the spread code sequence with the digital data after the A/D conversion of the A/D converter to estimate the spread code generation timing having the maximum correlation value, an inverse spread code generating circuit 73 for generating an inverse spread code which is a replica of the spread code which is estimated by the synchronous acquisition circuit 74, an inverse spread circuit 72 for inversely spreading the digital data with an inverse spread code, and a clock generating circuit 18 for generating clocks necessary for each part of the device.

In the CDMA receiver thus constructed, the reception RF signal which is received from the reception antenna 11 is input to the quasi-coherent detecting circuit 12, converted to the base band signal and then output. The DC offset components of the base band signal are removed by the capacitor 71. The base band signal from which the DC offset components are removed is subjected to A/D conversion by the A/D converter 13, then the phase timing of the spread code having the maximum correlation value is estimated by the synchronous acquisition circuit 74, and then the digital signal after the A/D conversion is subjected to the inverse spread processing in the inverse spread circuit 72 by using as a replica the spread code generated at the reception delay position in the inverse spread code generating circuit 73.

Figure 9:
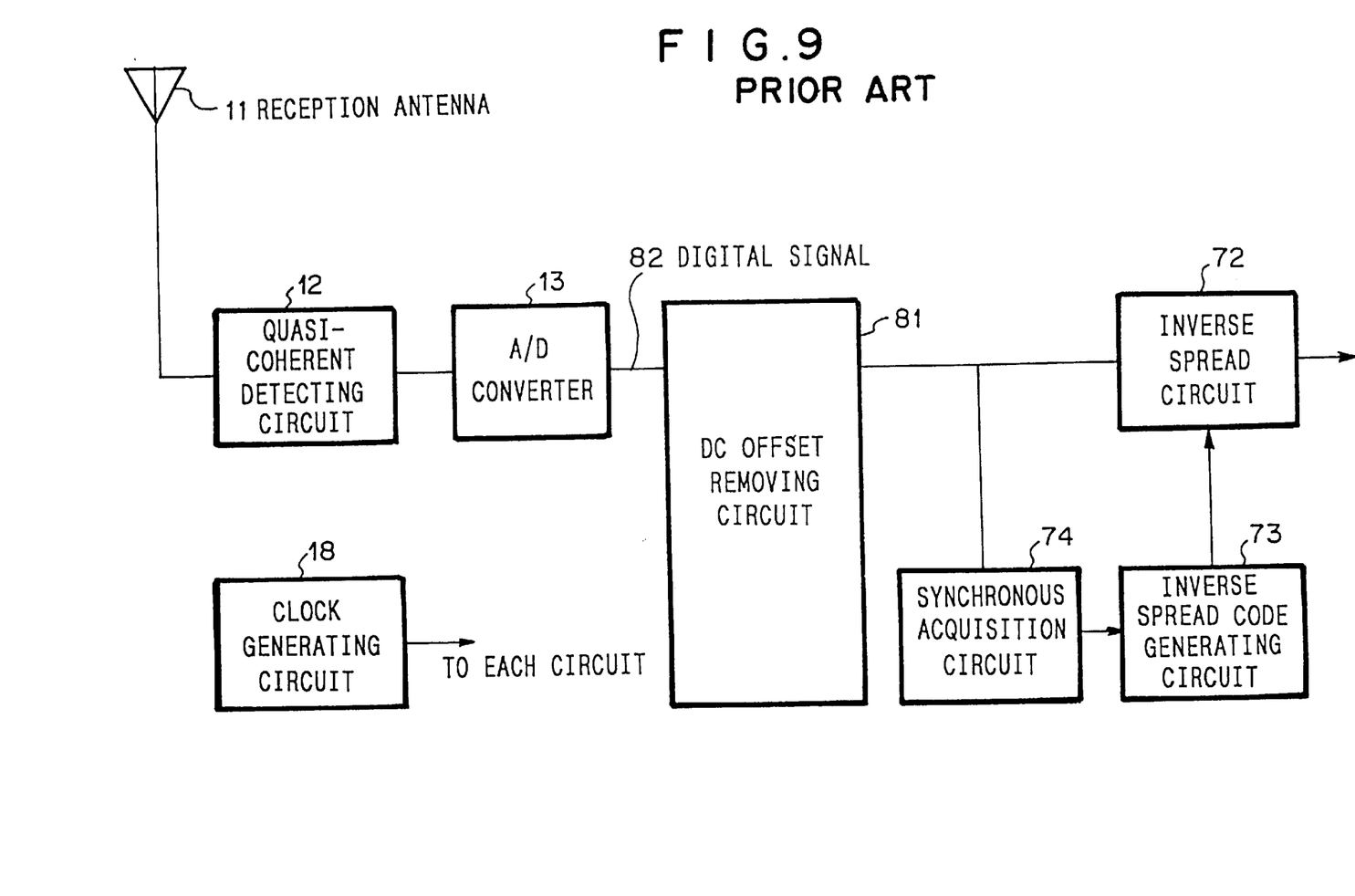
FIG. 9 is a block diagram showing another conventional CDMA receiver.

FIG. 9 is a block diagram showing another construction of the CDMA receiver containing an DC offset removing circuit. The same reference numerals as those of FIG. 8 are represented by the reference numerals. The difference of the receiver of FIG. 9 from that of FIG. 8 resides in that a DC offset removing circuit for removing DC offset from the A/D-converted output signal 82 is provided, and the signal from which the DC offset is removed is subjected to the inverse spread processing.

In this construction, the reception RF signal which is received by the reception antenna 11 is input to the synchronization detecting circuit 12, converted to a base band signal and then output. The base band signal is input to the A/D converter 13 and converted to a digital signal. The digital signal 82 which is output from the A/D converter 13 is input to the DC offset removing circuit 81 to remove the DC offset components. By using the signal from which the DC offset components are removed, the phase timing of the spread code having the maximum correlation value is estimated by the synchronous acquisition circuit 74, and the digital signal after the DC offset is removed is subjected to the inverse spread processing in the inverse spread circuit 72 by using as a replica the spread code generated from the inverse spread code generating circuit 73 at the reception delay position.

Figure 10:
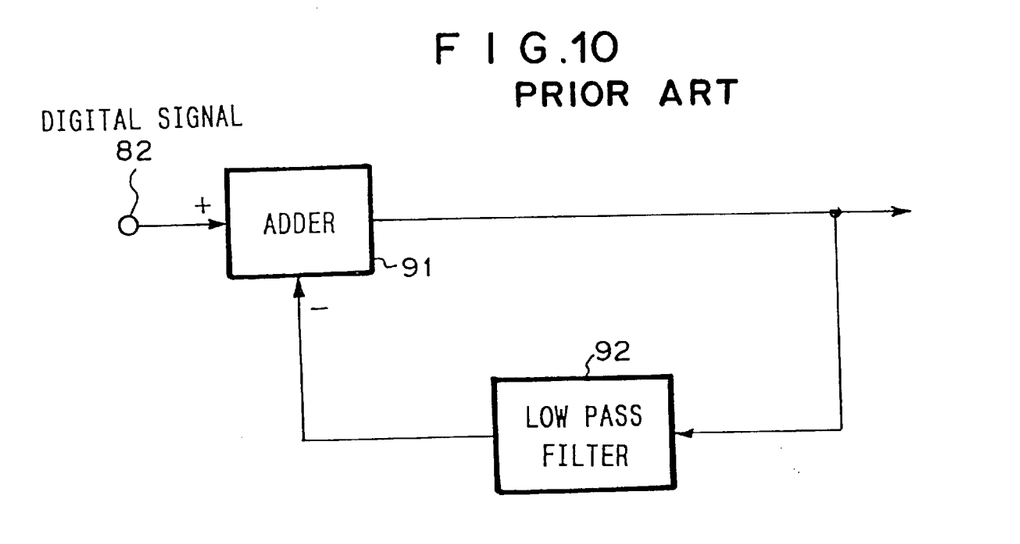
FIG. 10 is a block diagram showing the internal construction of a DC offset removing circuit of FIG. 9.

FIG. 10 shows the internal construction of the DC offset removing circuit 81. In FIG. 10, the DC offset removing circuit 81 comprises a low-pass filter 92 for removing signal components other than the DC component, and an adder 91 for inverting the signal components thus removed and adding the inverted signal components to the signal 82.

In this construction, the base band signal 82 based on the digital signal output from the A/D converter 13 is input to the low-pass filter 92 through the adder 91. In the low-pass filter 92, the signal components other than the DC component are removed from the base band signal 82. At this time, the output signal of the low-pass filter 92 is set as an estimation value of the DC component, and the estimation value is inverted and input to the adder 91, whereby the signal from which the DC offset component is removed is output from the adder 91.

The above-described conventional technique has the following problems.

As a first problem, the conventional CDMA synchronous acquisition circuit shown in FIG. 7 has such a drawback that the DC offset components due to D/A conversion, A/D conversion and spread code unbalance are contained in the correlation value calculated by the correlator. Accordingly, an accurate correlation value level cannot be detected when the maximum correlation value is detected by using this correlation value to estimate the optimum spread code generating timing, and thus an erroneous phase position may be estimated as the maximum correlation value. Therefore, a reception error occurs, and thus reception quality is lowered.

As a second problem, the conventional CDMA receiver shown in FIG. 8 has such a drawback that the DC offset component due to the A/D converter cannot be removed from the digital data used in the synchronous acquisition circuit because the DC offset component is removed by the capacitor before the A/D conversion.

As a third problem, the convention CDMA receiver has such a drawback that when a correlation value is calculated on the digital data passed through the DC offset removing circuit by a correlator in the synchronous acquisition circuit, the DC offset cannot be accurately removed if the spread code varies on a symbol basis. Particularly when codes having an extremely long coding period are used and the spread codes are used on a symbol basis, the DC offset component which occurs in accordance with the code balance of the spread code used vary on a symbol basis, and thus the removal of the DC offset components is insufficient in the conventional DC offset removing circuit for removing DC offset components which are expected in advance. Further, there is also such a drawback that the power consumption of the DC offset removing circuit is large. This is because the DC offset components are removed from the signals at the stage before the synchronous acquisition circuit, and the clock corresponding to the chip rate of the spread code is needed to actuate the DC offset removing circuit, so that a semiconductor device which works at high speed and needs large power consumption is needed.

SUMMARY OF THE INVENTION

The present invention has been implemented to overcome the above problems of the prior art, and has an object to provide a CDMA synchronous acquisition circuit which can surely remove DC offset components contained in a base band signal to obtain an accurate correlation value level, prevent failure of detection of the maximum value of the correlation value and detect an accurate spread code generation timing.

In order to attain the above object, according to the present invention, a CDMA synchronous acquisition circuit for receiving a CDMA signal and performing synchronous acquisition on the CDMA signal, comprises a receiving unit for receiving a signal and decoding the received signal to a reception base band signal which is spread-modulated in a CDMA mode, a correlation circuit for calculating a correlation value for the received base band signal every timing within one chip of a spread code by a correlator, and means for detecting the maximum value of the correlation value to estimate the spread code generation timing of a spread-modulated transmission base band signal within a precision of one chip of the spread code, wherein the correlator includes offset removing means for removing a DC offset component due to unbalance of the code balance of the spread code.

Further, the offset removing means may include measuring means for measuring the code balance of the spread code, first multiplying means for multiplying the measurement result and the output signal after the calculation of the correlation value, a low-pass filter for removing high frequency components of the multiplication output, second multiplying means for multiplying the removed output and the measurement result, and means for reducing the multiplication output from the output signal after the calculation of the correlation value.

The measuring means may include first and second counters for counting a positive code and a negative code of a spread code in synchronism with the clock corresponding to the chip rate of the spread code, and a subtraction circuit for outputting the difference between the count values of the first and second counters every symbol of the spread code to set the subtraction result is set as a measurement result.

Accordingly, by measuring the code balance of the spread code every symbol and removing the DC offset with the measured code balance, the DC offset components contained in the base band signal can be surely removed even when the spread code varies on a symbol basis, so that the accurate correlation value level can be detected.

Further, by removing the DC offset components in accordance with the code balance of the spread code for the correlation value calculated by the correlator, only the positive and negative code counters need therein the clock corresponding to the chip rate of the spread code in the DC offset removing circuit, and thus it does not need any semiconductor device which operates at high speed and has large power consumption as in the case of a conventional DC offset circuit, so that the power consumption can be reduced.

Still further, plural correlators may be provided to calculate respective correlation values at different spread code generating timings.

Accordingly, the correlation values are calculated over one period of a spread code sequence by using correlators of N which are different in the spread code generation timing, whereby the calculation speed of the correlation values over one period of the spread code can be increased by N times.

Further, with respect to the maximum value of the correlation values, detection means for detecting correlation values of N from the maximum value of the correlation values may be provided.

Accordingly, plural spread code generating timings are output in the order from the timing having the maximum correlation value. Therefore, even when plural waves due to reflection waves are received, the spread code generating timing for each reflection wave can be substantially accurately detected, so that a pass diversity effect based on RAKE composition, etc. can be provided with higher precision.

DETAILED DESCRIPTION OF THE PREFERRED EMBODIMENT

A preferred embodiment according to the present invention will be described with reference to the accompanying drawings.

First Embodiment

Figure 1:
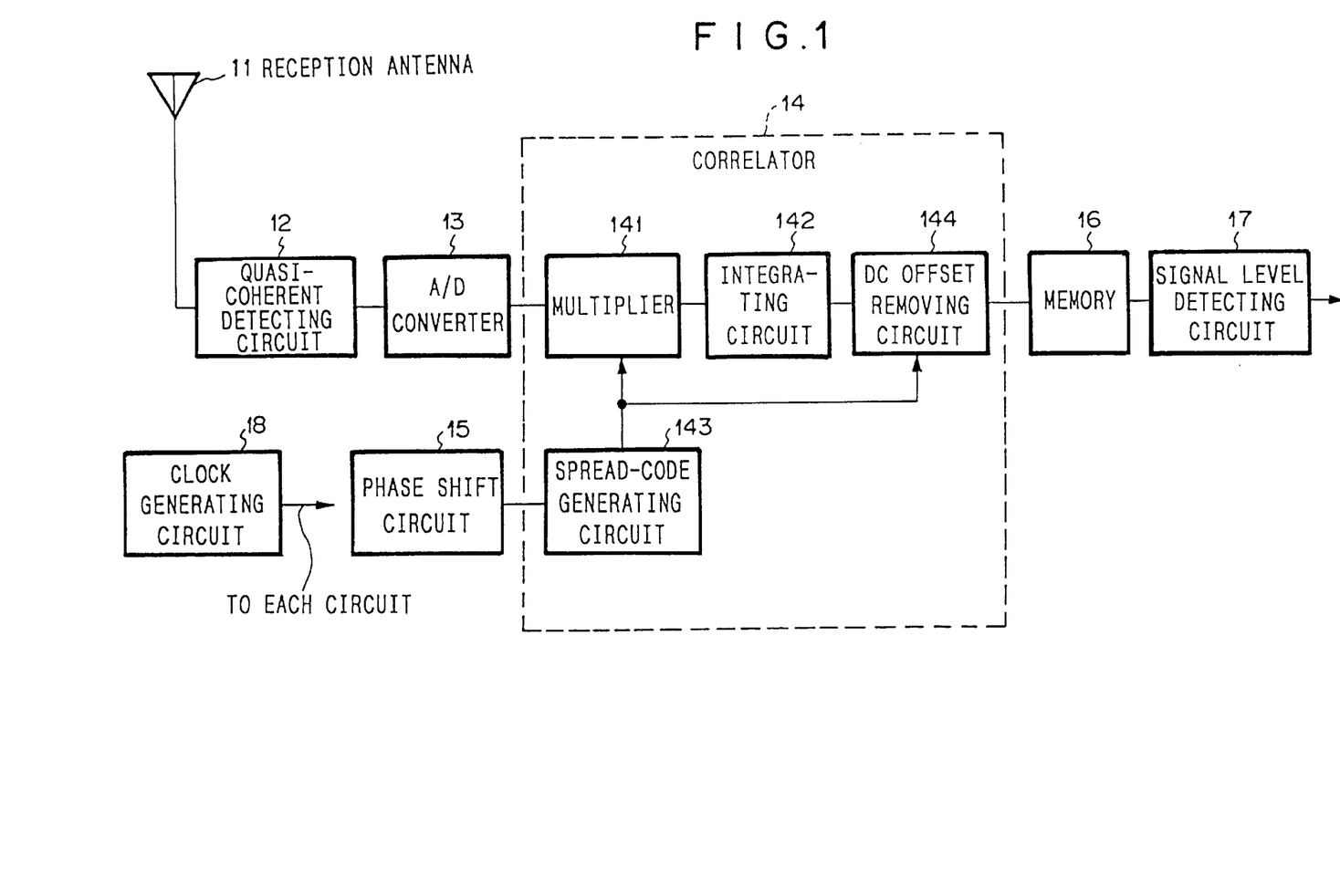
FIG. 1 is a block diagram showing a first embodiment of a CDMA synchronous acquisition circuit according to the present invention.

FIG. 1 is a block diagram showing the construction of a first embodiment of a CDMA synchronous acquisition circuit according to the present invention. The same elements as shown in FIGS. 7 to 9 are represented by the same reference numerals.

In FIG. 1, the difference of the CDMA synchronous acquisition circuit of the first embodiment from the conventional CDMA synchronous acquisition circuit resides in that the correlator 14 is provided with a DC offset removing circuit 144 for removing DC offset from the output of the integrating circuit 142.

Next, the operation of the first embodiment of the CDMA synchronous acquisition circuit will be described.

As shown in FIG. 1, the reception RF signal which is received by the reception antenna 11 is input to a quasi-coherent detecting circuit 12 to be converted to a base band signal, and then the base band signal thus obtained is output. The base band signal is input to an A/D converter 13 to be converted to a digital signal. The base band signal based on the digital signal which is output from the A/D converter 13 is input to the correlator 14. In the correlator 14, a spread code sequence output from a spread code generating circuit 143 and an output signal of the A/D converter are multiplied every one-chip of the spread code by using a multiplier 141. The output of the multiplier 141 is input to the integrating circuit 142 to be integrated over the length of the spread code sequence. The output of the integrating circuit 142 is set as a correlation value at a spread code generating timing of the spread code sequence. The output of the integrating circuit 142 is input to the DC offset removing circuit 144 to remove the DC offset components, and then accumulated in the memory 16. After the correlation value is output from the correlator 14, the spread code generating circuit 143 is shifted by a constant time shorter than the chip rate of the spread code by a phase-shift circuit 15. At this spread code generation timing, the correlation value is likewise calculated from the reception signal, and accumulated in the memory 16. As described above, the correlation value is calculated over one period of the spread code sequence, and accumulated in the memory 16. The spread code generation timing having the maximum correlation value is selected from the correlation value level accumulated in the memory 16 by a signal level detecting circuit 17. The reception signal is subjected to the inverse spread processing in an inverse spread circuit (not shown) by using as a replica the spread code sequence which is generated from the spread code generation timing.

In the CDMA synchronous acquisition circuit, the base band signal which has been subjected to the A/D conversion by the A/D converter 13 contains the DC offset components occurring in the A/D conversion process. Accordingly, the correlation value output from the integrating circuit 142 of the correlator 14 contains the DC offset component due to the unbalance of the code balance of the spread code, the DC offset component due to D/A conversion in the transmitter, and the DC offset components due to A/D conversion in the receiver. When a spread code having an extremely long code length is divided on a one-symbol basis, or when a spread code in which a spread code sequence varies every symbol is used, the code balance of the spread code varies on a symbol basis. Accordingly, in this case, the DC offset component contained in the reception signal is not fixed.

Here, the construction of the DC offset removing circuit 144 will be described.

Figure 2:
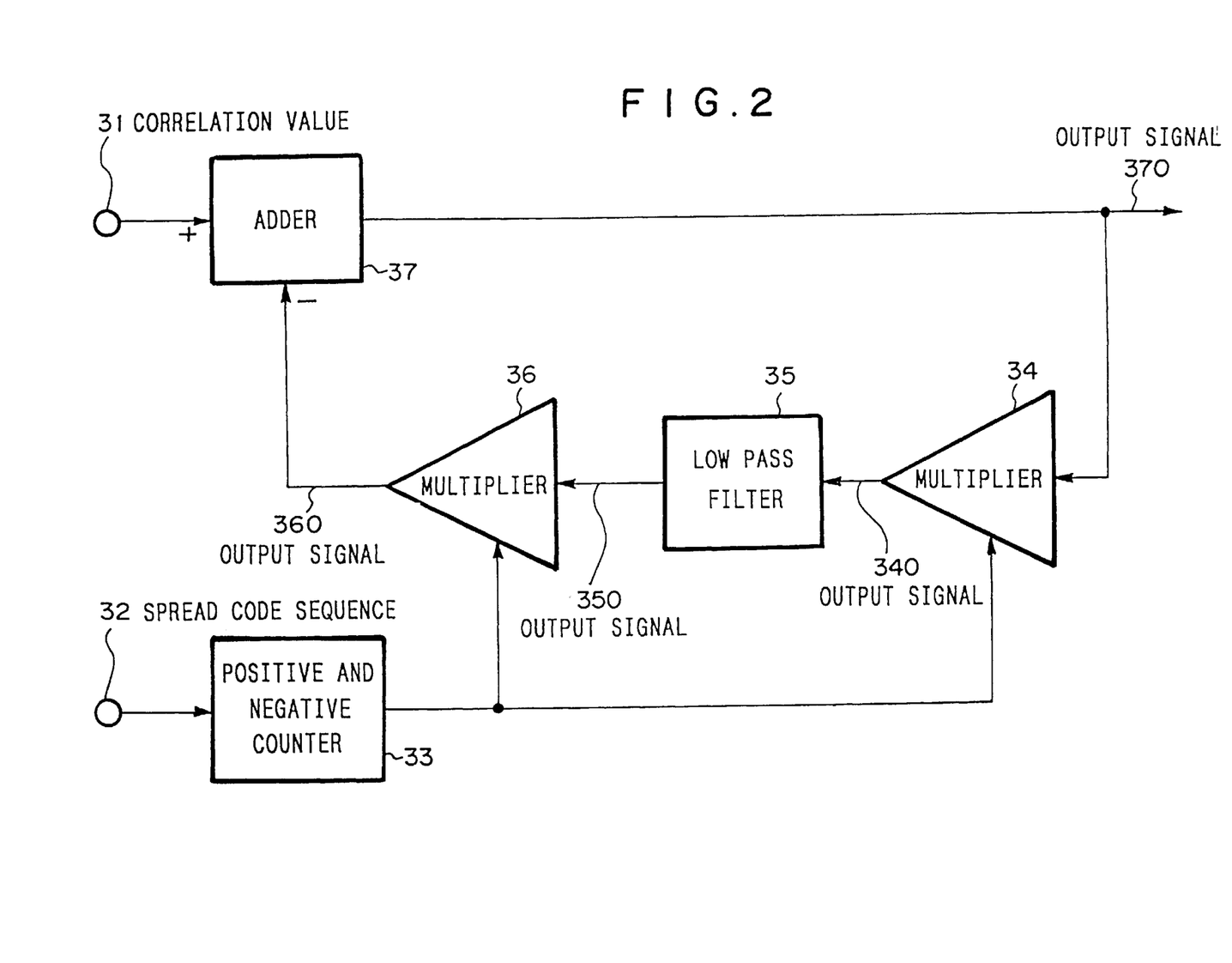
FIG. 2 is a block diagram showing the internal construction of a DC offset removing circuit.

FIG. 2 is a block diagram showing the internal construction of the DC offset removing circuit 144 of FIG. 1.

In FIG. 2, unlike the conventional circuit (FIG. 10), the DC offset removing circuit 144 comprises multipliers 34 and 36 which are provided at the input and output sides of a low-pass filter 35 respectively, and a positive and negative code counter 33 for outputting the difference between a positive code "+1" and a negative code "−1" of the spread code every symbol and inputting it into the multipliers 34 and 36.

In this construction, the spread code sequence 32 output from the spread code generating circuit 143 is input to the positive and negative code counter 33. The positive and negative counter 33 counts the difference between the positive code "+1" and the negative code "−1" of the spread code every symbol, and outputs the count value, whereby the positive and negative counter 33 measures the code balance of the spread code every symbol. The correlation value 31 output from the integrating circuit 142 is input to the multiplier 34 to be multiplied by the output of the positive and negative code counter 33, whereby the correlation value 31 is weighted with the positive and negative code difference every symbol. Through this weight process, an output signal 340 to minimize the DC offset component due to the unbalance of the code balance of the spread code is output from the multiplier 34. The output signal 340 of the multiplier 34 is input to the low-pass filter 35 to remove high-frequency components, whereby the output signal 350 of the low-pass filter 35 is set as an estimation value of the DC offset component before the inverse spread processing. The estimation value is input to the multiplier 36, and multiplied by the output of the positive and negative code counter 33, whereby the output signal 360 of the multiplier 36 is set as an estimation value of the DC offset component contained in the correlation value. The output signal 360 of the multiplier 36 is input to an inverse input terminal of an adder 37, thereby outputting from the adder a signal 370 which is obtained by subtracting the output signal 360 of the multiplier 36 from the correlation value 31 which is output from the integrating circuit 142. Accordingly, the output signal 370 of the adder 37 is set as a correlation value from which the DC offset component contained in the correlation value level is removed.

FIGS. 3a to 3e show a frequency spectrum diagram of signals of respective parts of FIG. 2, wherein the abscissa represents frequency and the ordinate represents power level.

Figures 3A, 3B, 3C, 3D, 3E:
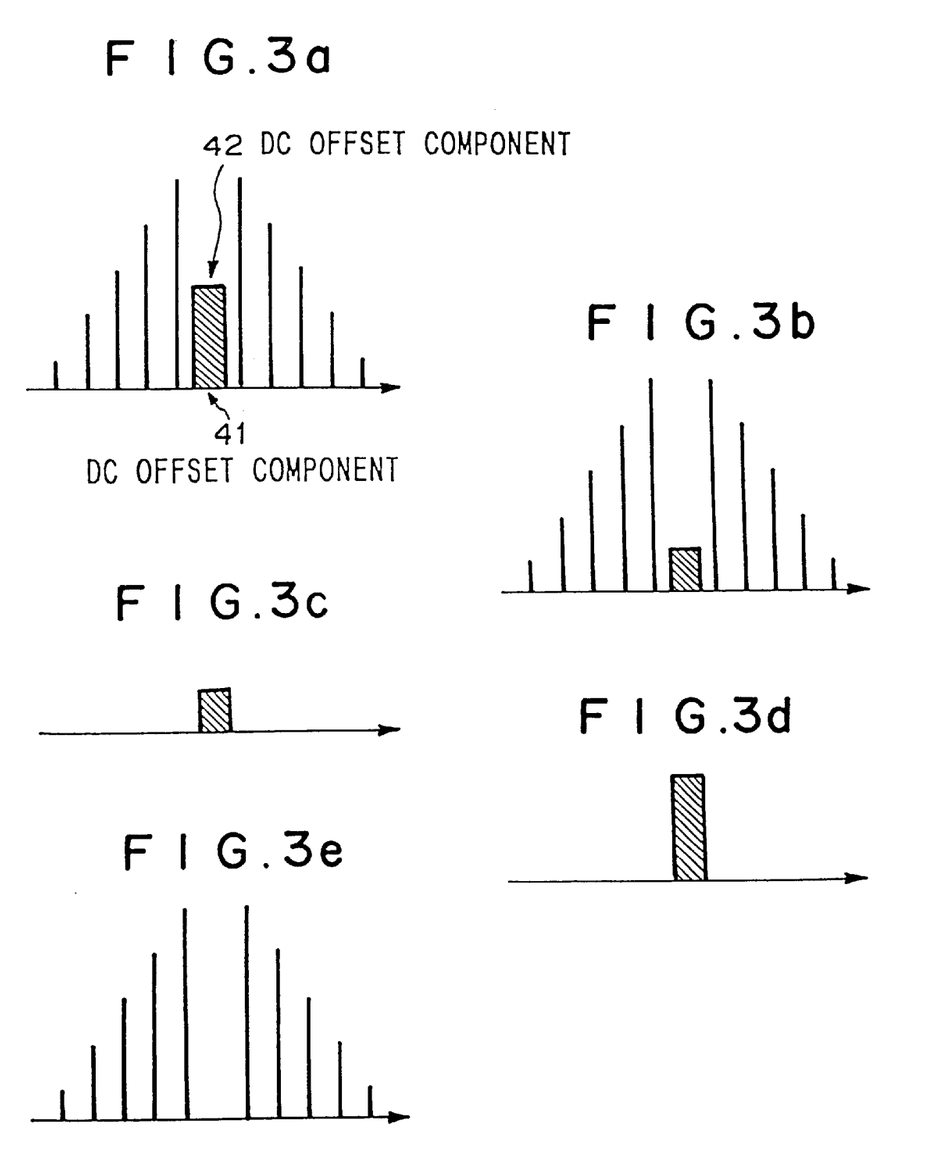
FIGS. 3a to 3e show frequency spectra of signals of respective parts shown in FIG. 1.

The signal 31 input to the non-inversion input terminal of the adder is shown in FIG. 3a. As shown in FIG. 3a, The signal 31 contains not only the reception signal, but also the DC offset component 41 due to the unbalance of the code balance of the spread code and the DC offset component 42 due to the A/D conversion and the D/A conversion. The signal 31 is input to the multiplier 34 to be multiplied by the output of the positive and negative code counter 33, thereby removing the DC offset component 41 due to the unbalance of the code balance of the spread code. Accordingly, as shown in FIG. 3b, the output signal 340 of the multiplier 34 contains not only the reception signal, but also the DC offset component 42 due to the A/D conversion and the D/A conversion. The output signal 340 of the multiplier is input to the low-pass filter to remove high frequency components.

Accordingly, as shown in FIG. 3c, the output signal 350 of the low pass filter 35 contains only the DC offset component 42 due to the A/D conversion and the D/A conversion, that is, the DC offset component before the correlation value is calculated (the fixed component in the device). The output signal 350 of the low pass filter 35 is input to the multiplier 36 to be multiplied by the output of the positive and negative code counter 33.

Accordingly, as shown in FIG. 3d, the output signal 360 of the multiplier 36 contains the DC offset component 41 due to the unbalance of the code balance of the spread code and the DC offset component 42 due to the A/D conversion and the D/A conversion. At this time, the value of the DC offset component 41 varies every symbol. The output signal 360 of the multiplier 36 is input to the inversion input terminal of the adder 37, and subtracted from the signal 31 which is input to the non-inversion input terminal.

The output signal 370 corresponding to the calculation result is a signal from which the DC offset component contained in the correlation value is removed as shown in FIG. 3e.

Next, the internal construction of the positive and negative code counter 33 will be described with reference to FIG. 4.

Figure 4:
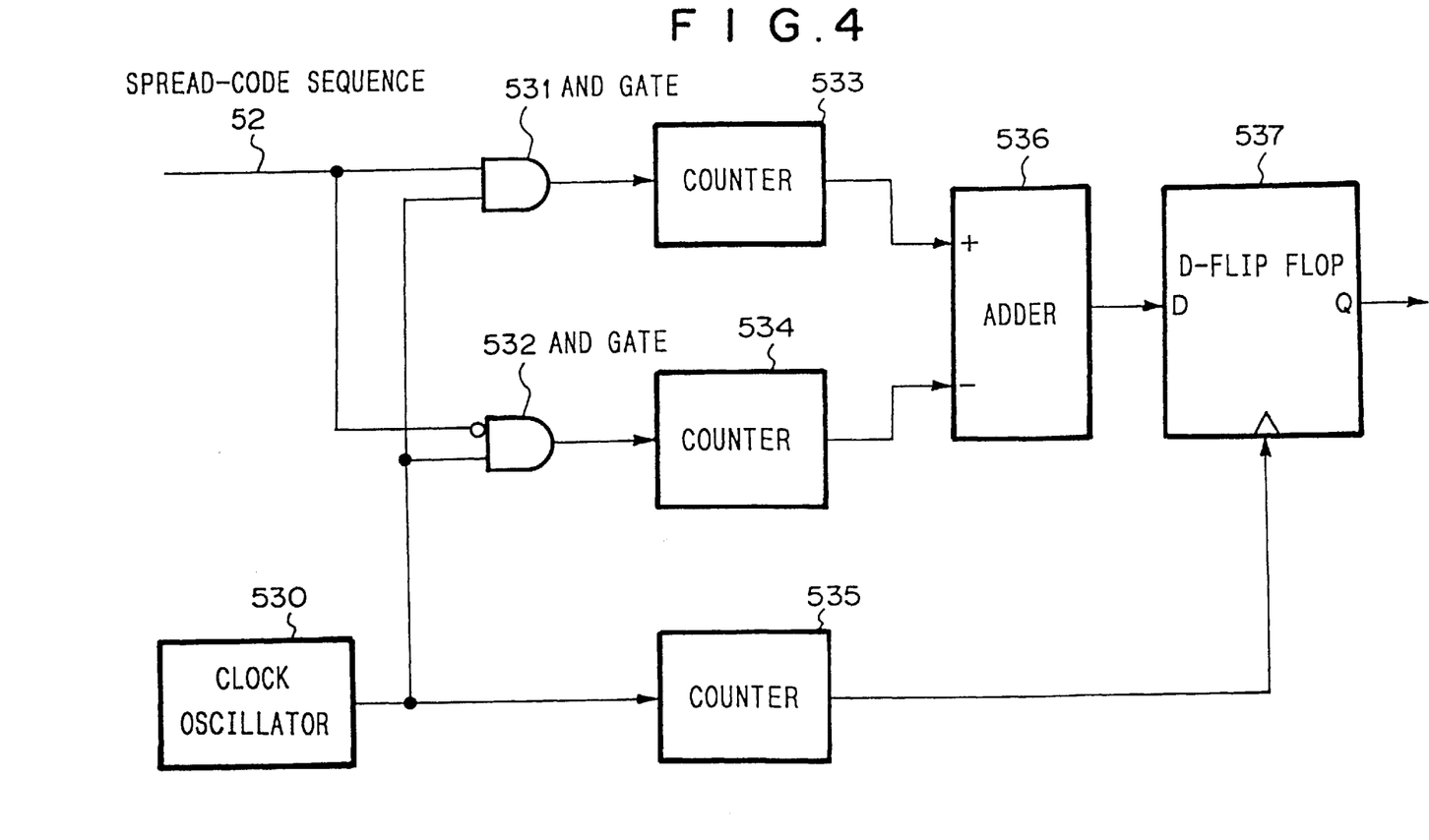
FIG. 4 is a block diagram showing the construction of a positive and negative code counter shown in FIG. 2.

In FIG. 4, the positive and negative code counter 33 comprises a clock oscillator 530 for outputting the clock corresponding to the chip rate of the spread code, AND gates 531 and 532 which are supplied with the clock at respective one input terminals thereof, a counter 533 which counts up in response to the output of the AND gate 531, and a counter 534 which counts up in response to the output of the AND gate 532.

The positive and negative counter 33 comprises a counter 535 which counts in accordance with the clock from the clock oscillator 530 and outputs "1" every the time corresponding to one symbol of the spread code, an adder 536 for calculating the difference between the count value of the counter 533 and the count value of the counter 534, and a DFF (D flip flop) 537 which is supplied with the calculated difference of the count values as a D input and with the output of the counter 535 as a clock input.

In the above construction, the clock corresponding to the chip rate of the spread code is output from the clock oscillator 530, and input to the counter 535. The counter 535 counts in accordance with the clock, and outputs "1" every the time corresponding to one symbol of the spread code. This output is input to the clock terminal of the DFF 537. Further, the spread code sequence 52 is input to the clock terminal of the AND gate 531, and also input to the inversion input terminal of the AND gate 532. The other input terminals of the AND gates 531 and 532 are supplied with the clock from the clock oscillator 530. Accordingly, when the spread code sequence 52 is a positive code "+1", the output of the AND gate 531 is set to "1", and when the spread code sequence 52 is a negative code "−1", the output of the AND gate 532 is set to "1". The counter 533 counts up when the output of the AND gate 531 is set to "1", and outputs its count value while keeping the count value without counting up when the output of the AND gate 531 is equal to "0". Likewise, the counter 534 counts up when the output of the AND gate 532 is set to "1", and outputs its count value while keeping the count value without counting up. The count value of the counter 533 is input to the non-inversion input terminal of the adder 536, and the count value of the counter 534 is input to the inversion input terminal of the adder 536 to calculate the difference between both the count values. The different of the count values thus calculated is input to the DFF 537 every time the output of the counter 535 is set to "1", and kept therein. The output of the DFF 537 is input to the multipliers 34 and 36 of FIG. 2 as described above.

As described above, in the DC offset removing circuit of the synchronous acquisition circuit, the DC offset of the correlation value after the correlation value is calculated is removed in accordance with the code balance of the spread code. In the DC offset removing circuit, "+1" and "−1" of the spread code are respectively counted in synchronism with the clock corresponding to the chip rate of the spread code, and the difference between these count values every symbol of the spread code is set as a measurement result of the code balance. The measurement result is multiplied with the correlation value after the calculation of the correlation value, and the high frequency components of the multiplication result are removed by the low pass filter. The final output is multiplied by the measurement result. The multiplication result is subtracted from the correlation value after the calculation of the correlation value to remove the DC offset component.

Further, since the DC offset circuit of the present invention is designed to remove the DC offset component on a symbol basis, the clock corresponding to the chip rate of the spread code is needed only in the positive and negative counter, and thus the repetitive frequency of the clocks of the other parts can be reduced to be less than the conventional device. Accordingly, any semiconductor which operates at high speed and needs large power consumption is not needed, and thus the power consumption can be reduced.

Still further, the conventional circuit can remove only the DC offset component which is expected in advance. On the other hand, according to the synchronous acquisition circuit of the present invention, since the difference between the positive and negative codes of the spread code is measured on a one-symbol basis, even when the code balance of the spread code varies on a symbol basis, for example, when the spread code varies every symbol or when a spread code having an extremely long code length is used while divided, the DC offset component can be estimated every symbol, and removed.

Next, the internal construction of the signal level detecting circuit 17 will be described.

Figure 5:
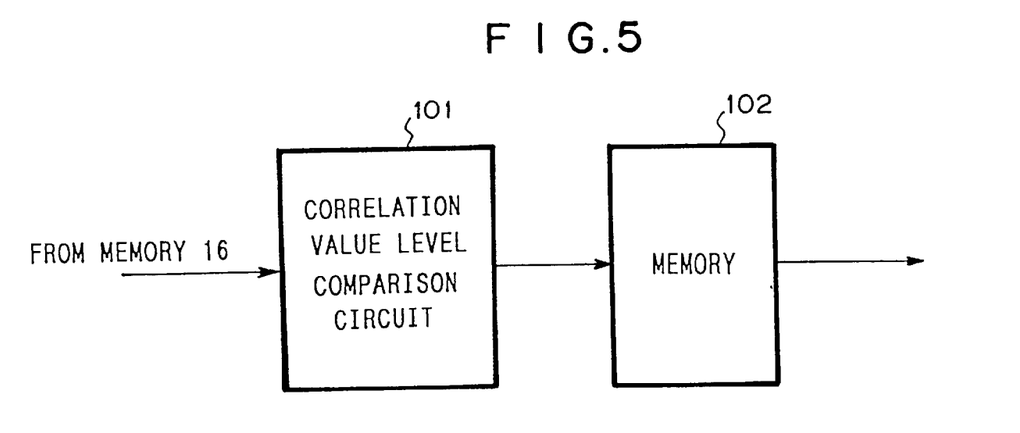
FIG. 5 is a block diagram showing the internal construction of a signal level detecting circuit shown in FIG. 1.

FIG. 5 is a block diagram showing the internal construction of the signal level detecting circuit 17 of FIG. 1. In FIG. 5, the signal level detecting circuit 17 inputs into a correlation value level comparison circuit 101 the correlation value level over one period of the spread code sequence input to the memory 16 into the correlation by the amount corresponding to one spread code generating timing. Subsequently, it inputs the correlation value level of another spread code generation timing into the correlation value level comparison circuit 101. In the correlation value level comparison circuit 101, the correlation value levels which are calculated at two different spread code generation timings are compared with each other, and the timing phase information and the correlation value level of the larger correlation value level are kept. Likewise, the correlation value levels over one period of the spread code sequence are compared, and the timing phase information of the maximum correlation value level is output to the memory 102, whereby the spread code generation timing having the maximum correlation value is accumulated in the memory 102.

As described above, in the CDMA synchronous acquisition circuit of FIG. 1, plural spread code generating timings which are output from the signal level detecting circuit 17 are output in the order from the spread code generating timing having the maximum correlation value by using the signal level detecting circuit 17 of FIG. 5. Therefore, even when plural waves due to reflection waves are received, the spread code generation timings corresponding to the respective reflection waves can be substantially accurately detected, and the pass diversity effect based on the RAKE composition, etc. can be shown with higher precision.

Second Embodiment

Figure 6:
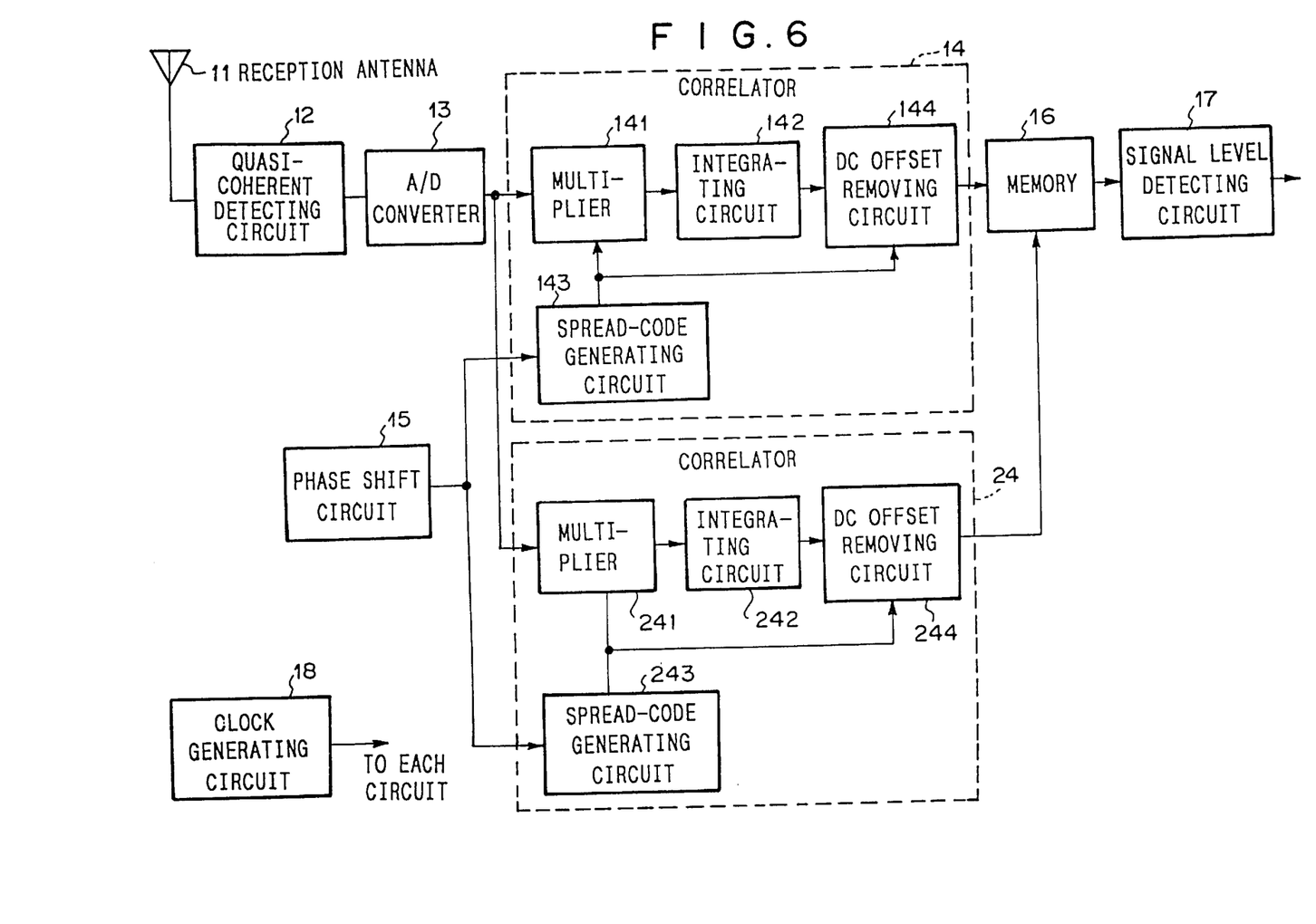
FIG. 6 is a block diagram showing the construction of a CDMA synchronous acquisition circuit according to a second embodiment of the present invention.

FIG. 6 is a block diagram showing a second embodiment of the CDMA synchronous acquisition circuit according to the present invention. The same elements as shown in FIGS. 7 to 9 are represented by the same reference numerals. In FIG. 6, the difference of the CDMA synchronous acquisition circuit of the second embodiment from that of the first embodiment resides in that a correlator 24 is provided in addition to the correlator 14.

In this construction, the reception RF signal which is received by the reception antenna 11 is input to the quasi-coherent detecting circuit 12, and then converted to the base band signal. The base band signal is input to the A/D converter 13 to be converted to a digital signal. The base band signal based on the digital signal which is output from the A/D converter 13 is input to two correlators, that is, the correlator 14 and the correlator 24.

In the correlator 14, the spread code sequence which is generated at a phase timing and output from the spread code generating circuit 143 and the output signal of the A/D converter 13 are multiplied every one-chip of the spread code by using the multiplier 141. The output of the multiplier 141 is input to the integrating circuit 142, and integrated over the length of the spread code sequence. The output of the integrating circuit 142 is set as a correlation value at a spread code generation timing of the spread code sequence. The output of the integrating circuit 142 is input to the DC offset removing circuit 143 to remove the DC offset component thereof, and then accumulated in the memory 16. After the correlation value is output from the correlator 14, the spread code generating circuit 143 is shifted by a constant time shorter than the chip rate of the spread code by the phase shift circuit 15, calculates the correlation value from the reception signal at the spread code generation timing and accumulated in the memory 16.

Likewise, in the correlator 24, a spread code sequence which is generated at another phase timing and output from the spread code generating circuit 243 and the output signal of the A/D converter 13 are multiplied every one-chip of the spread code by using the multiplier 241. The output of the multiplier 241 is input to the integrating circuit 242, and integrated over the length of the spread code sequence. The output of the integrating circuit 242 is set as a correlation value at a spread code generation timing of the spread code sequence. The output of the integrating circuit 242 is input to the DC offset removing circuit 243 to remove the DC offset component thereof, and then accumulated in the memory 16. After the correlation value is output from the correlator 24, the spread code generating circuit 243 is shifted by a constant time shorter than the chip rate of the spread code by using the phase shift circuit 15, and it calculates the correlation value from the reception signal at the above spread code generation timing in the same manner.

By using the two correlators having different phase timings as described above, the correlation value is calculated over one period of the spread code sequence to increase the calculation speed of the correlation value over one period of the spread code to be twice as high as the first embodiment. The spread code generation timing having the maximum correlation value level is selected from the correlation value levels accumulated in the memory 16 by the signal level detecting circuit 17. By using this spread code generation timing, the reception signal is subjected to the inverse spread processing by using it as a replica of the spread code generated from the above timing in a decoding circuit (not shown). Even when the synchronous acquisition circuit is constructed by using plural correlators as described above, the correlation value level can be detected at high speed and accurately, and thus the accurate spread code generation timing can be estimated by providing the DC offset removing circuit to each of the correlators.

As described above, according to the present invention, the code balance of the spread code is measured every symbol, and the DC offset is removed by using the measured code balance. Accordingly, there is a first effect that even when the spread code varies on a symbol basis, the DC offset component contained in the base band signal can be surely removed, and thus the accurate correlation value level can be detected.

Further, the DC offset component is removed from the correlation value calculated by the correlator in accordance with the code balance of the spread code, and thus in the DC offset removing circuit, the clock corresponding to the chip rate of the spread code is needed only in the positive and negative code counter. Therefore, there is a second effect that any semiconductor device which operates at high speed and needs large power consumption like a conventional DC offset circuit is not needed, and thus the power consumption can be reduced.

Still further, there is a third effect that the calculation speed of the correlation value over one period of the spread code can be increased by N-times by calculating the correlation value over one period of the spread code sequence by using correlators of N which are different in phase timing.

Still further, plural spread code generation timings output from the signal level detecting signal are output in the order from the spread code generation timing having the largest correlation value. Therefore, there is a fourth effect that when plural waves due to reflection waves are received, the spread code generation timings corresponding to the respective reflection waves can be substantially accurately detected, and the pass diversity effect based on the RAKE composition, etc. can be achieved with high precision.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A circuit for attenuating D.C. components of a correlation value signal, comprising:
   a first adder that provides an output signal indicative of a difference between a value of a first input signal corresponding to the correlation value signal and a value of a second input signal;
   a first multiplier, coupled to the output signal of the first adder, the first multiplier providing an output signal that varies according to the output signal of the first adder and to a code balancing signal that corresponds to a count of positive and negative values of a spread code for the correlation value signal;
   a low pass filter, coupled to the output signal of the first multiplier; and
   a second multiplier, coupled to an output signal of the low pass filter, the second multiplier providing an output signal that varies according to the output signal of the low pass filter and to the code balancing signal, whereby the output signal of the second multiplier is used to provide the second input signal to the first adder to thereby attenuate D.C. components of the first input signal.

2. A circuit for attenuating D.C. components of a correlation value signal, according to claim 1, further comprising:
   a first counter that increments in response to a positive code value in the spread code;
   a second counter that increments in response to a negative code value in the spread code; and
   a second adder, coupled to the first and second counters, the second adder providing an output signal corresponding to a difference between a count of positive code values and a count of negative code values.

3. A circuit for attenuating D.C. components of a correlation value signal, according to claim 2, further comprising:
   a flip-flop coupled to the second adder and latching the output signal of the second adder.

4. A circuit for attenuating D.C. components of a correlation value signal, according to claim 3, further comprising:
   a first AND gate that provides an output signal that actuates the first counter in response to a positive code value in the spread code; and
   a second AND gate that provides an output signal that actuates the second counter in response to a negative code value in the spread code.

5. A circuit for attenuating D.C. components of a correlation value signal, according to claim 4, further comprising:
   a clock oscillator; and
   a third counter, coupled to the clock oscillator, the third counter providing an output signal that causes the flip-flop to latch the output signal of the adder upon receipt of each symbol of the spread code.

6. A circuit for attenuating D.C. components of a correlation value signal, comprising:
   means for providing an output signal value by subtracting a first input signal value from a second input signal value that corresponds to the correlation value signal;
   first multiplying means for multiplying the output signal value by a code balancing value that corresponds to a count of positive and negative values of a spread code for the correlation value signal;
   low pass filter means, coupled to the first multiplying means, for attenuating D.C. components of an input signal thereto; and
   second multiplying means, for multiplying a value of an output signal of the low pass filter means by the code balancing value to provide the first signal value.

7. A circuit for attenuating D.C. components of a correlation value signal, according to claim 6, further comprising:
   means for determining the code balancing value.

8. A circuit for attenuating D.C. components of a correlation value signal, according to claim 7, wherein the means for determining the code balancing value counts occurrences of positive and negative values within a symbol of the spread code sequence signal.

9. A circuit for attenuating D.C. components of a correlation value signal, according to claim 8, wherein the means for determining the code balancing value provides an output corresponding to a difference between the positive and negative values within the spread code sequence signal.

10. A circuit for attenuating D.C. components of a correlation value signal, according to claim 9, further comprising:
    means for latching the output of the means for determining the code balancing value.

11. A circuit for attenuating D.C. components of a correlation value signal, according to claim 10, wherein the means for latching includes a flip-flop.

12. A method for attenuating D.C. components of a correlation value signal, comprising:
    providing an output signal value by subtracting a first input signal value from a second input signal value that corresponds to the correlation value signal;
    providing a first intermediate output signal by multiplying the output signal value by a code balancing value that corresponds to a count of positive and negative values of a spread code for the correlation value signal;
    attenuating D.C. components of the first intermediate output signal to provide a second intermediate output signal;

multiplying the second intermediate output signal by the code balancing value to provide the first signal value.

13. A method for attenuating D.C. components of a correlation value signal, according to claim 12, wherein providing the code balancing value includes:

counting positive code values within the spread code sequence signal;

counting negative code values within the spread code sequence signal;

determining the code balancing value by calculating the difference between an amount of positive code values and an amount of negative code values.

14. A method for attenuating D.C. components of a correlation value signal, according to claim 13, further comprising:

latching the code balancing signal.

* * * * *